United States Patent
Kozlowski et al.

(10) Patent No.: US 11,216,916 B1
(45) Date of Patent: Jan. 4, 2022

(54) HISTORY CLAMPING FOR DENOISING DYNAMIC RAY-TRACED SCENES USING TEMPORAL ACCUMULATION

(71) Applicant: Nvidia Corporation, Santa Clara, CA (US)

(72) Inventors: Pawel Kozlowski, Truckee, CA (US); Tim Cheblokov, San Jose, CA (US); Alexey Panteleev, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 17/067,417

(22) Filed: Oct. 9, 2020

(51) Int. Cl.
*G06T 5/00* (2006.01)
*G06T 5/50* (2006.01)

(52) U.S. Cl.
CPC .............. *G06T 5/002* (2013.01); *G06T 5/50* (2013.01); *G06T 2207/10024* (2013.01); *G06T 2207/20221* (2013.01)

(58) Field of Classification Search
CPC .................................. G06T 5/002; G06T 5/50
See application file for complete search history.

(56) References Cited

U.S. PATENT DOCUMENTS

| | | | |
|---|---|---|---|
| 2018/0089807 A1* | 3/2018 | Reusch | G06T 7/246 |
| 2018/0301110 A1* | 10/2018 | Feng | G06T 1/20 |
| 2018/0357749 A1* | 12/2018 | Young | G06F 3/011 |
| 2020/0043122 A1* | 2/2020 | Xiao | G06T 15/80 |
| 2020/0074605 A1* | 3/2020 | Goyal | G06T 5/005 |

OTHER PUBLICATIONS

Pedersen, L. J. F. (Mar. 2016). Temporal reprojection anti-aliasing in Inside. In Game Developers Conference (vol. 3, No. 4, p. 10).*
Iglesias-Guitian, J. A., Moon, B., Koniaris, C., Smolikowski, E., & Mitchell, K. (Oct. 2016). Pixel History Linear Models for Real-Time Temporal Filtering. In Computer Graphics Forum (vol. 35, No. 7, pp. 363-372).*
Marrs, A., Spjut, J., Gruen, H., Sathe, R., & McGuire, M. (Aug. 2018). Adaptive temporal antialiasing. In Proceedings of the Conference on High-Performance Graphics (pp. 1-4).*

* cited by examiner

*Primary Examiner* — Sarah Lhymn
(74) *Attorney, Agent, or Firm* — Hogan Lovells US LLP

(57) ABSTRACT

Approaches presented herein can reduce temporal lag that may be introduced in a generated image sequence that utilizes temporal accumulation for denoising in dynamic scenes. A fast historical frame can be generated along with a full historical frame generated for a denoising process, with the fast historical frame being accumulated using an exponential moving average with a significantly higher blend weight. This fast history frame can be used to determine a clamping window that can be used to clamp a corresponding full historical value before, or after, reprojection. The fast historical blend weight can be adjusted to control the amount of noise versus temporal lag in an image sequence. In some embodiments, differences between fast and full historical values can also be used to determine an amount of spatial filtering to be applied.

20 Claims, 11 Drawing Sheets

HISTORY CLAMPING FOR DENOISING DYNAMIC RAY-TRACED SCENES USING TEMPORAL ACCUMULATION

BACKGROUND

As the quality of display devices—along with user expectations—continue to increase, there is a need to continually increase the quality of content to be displayed. This can include tasks such as removing noise and reducing artifacts in rendered images, such as may correspond to frames of content for video games or animation. Certain conventional approaches utilize processes such as temporal accumulation to attempt to denoise various effects, such as shadows, reflections, ambient occlusion, and direct lighting for ray tracing applications. In many situations however, this can lead to temporal lag for dynamic scenes, which may result in noticeable ghosting due to this accumulation being unable to quickly and accurately account for changes in dynamic scenes. Existing approaches to managing temporal lag have either failed to adequately reduce the undesired effects, or have added undesirable additional computational requirements and complexity.

BRIEF DESCRIPTION OF THE DRAWINGS

Various embodiments in accordance with the present disclosure will be described with reference to the drawings, in which.

DETAILED DESCRIPTION

Approaches in accordance with various embodiments can overcome deficiencies in existing approaches to image generation. In particular, various embodiments can provide for improved denoising of image artifacts, such as artifacts that may be introduced by ray tracing or other image generation or rendering techniques. In a system for generating images or video frames for a dynamic scene, there can be various artifacts resulting from changes in the scene. Temporal accumulation can be used to attempt to minimize a presence of at least some of these artifacts. A temporal accumulation approach can retain information from previously-generated frames in a sequence to attempt to provide at least some amount of temporal smoothing, where colors of pixels in a current frame are blended with colors from previous frames to attempt to minimize ghosting and other such artifacts, and provide for a smoother transition of colors in the scene. When blending colors from a current rendered frame and historical frames, it can be desirable to strike an appropriate balance when determining a blending weight. If the colors of the current frame are weighted too heavily, the effectiveness of the smoothing may be reduced, resulting in an increase in artifacts. Conversely, there may be undesirable temporal lag if the historical colors are weighted too heavily.

Figure 1A:
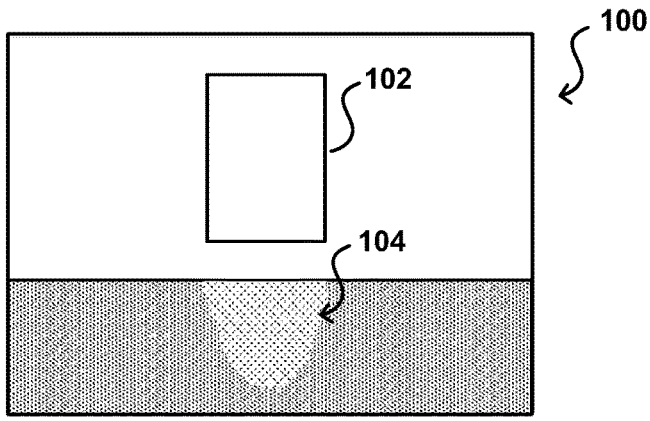
FIGS. 1A, 1B, 1C, and 1D illustrate images rendered for a dynamic scene, according to at least one embodiment.
Figure 1B:
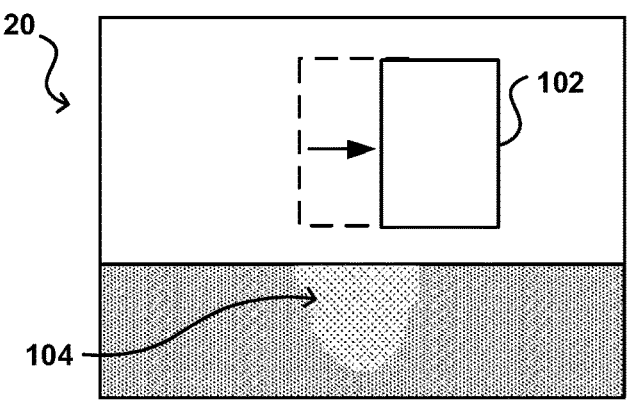
Figure 1C:
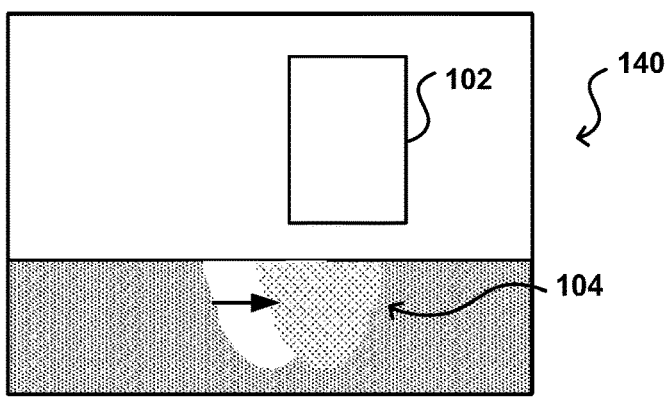
Figure 1D:
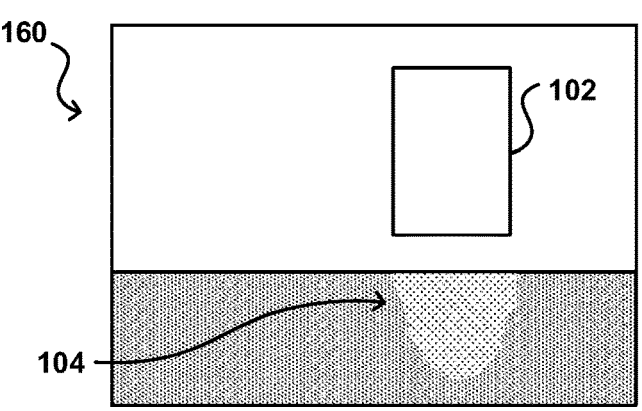

As an example, consider images FIGS. 1A through 1D. As depicted in the image 100 of FIG. 1A, there is a light source 102 on a wall, which may correspond to a window, lighted poster, mirror, or other such source of light. Visible on a nearby floor is a region 104 where the emitted or reflected light is brighter, resulting in a brighter coloring of those pixels resulting from the light source. In some embodiments, this may correspond to a dynamic scene where the positions of objects in a current view can change. For example, in image 120 of FIG. 1B there may have been a pan motion of a virtual camera, or other such motion, that caused a position of the light source 102 in the image to move relative to the prior frame. Many rendering engines will detect this motion or provide information about this motion, as may relate to motion vectors for various objects in the scene. This motion information may not indicate other related changes, however—as may correspond to, for example and without limitation: shadows, lighting, reflections, or ambient occlusions—that may change as a result of this motion, such as may be due to ray tracing involving one or more moving objects in a scene. If temporal smoothing is applied, the impact of the historical data may cause changes in the pixels of such a region or object, such as bright region 104, to not move together with the corresponding object 102. As illustrated in FIG. 1B, there may be little to no movement of this bright region 104 in an initial frame where light source 102 moved to the right. As illustrated in image 140 of FIG. 1C, there will be some temporal lag where bright region 104 will follow movement of light source 102 with some delay, until the bright region arrives at the appropriate location as illustrated in image 160 of FIG. 1D. Factors such as the blending weight and amount of historical data utilized can impact an extent of this lag, which in some cases may be quite noticeable and may be distracting to a viewer, or may at least reduce a perceived realism of the scene. It is desirable in at least some systems to retain advantages of temporal smoothing and accumulation, while reducing an impact of temporal lag on a dynamic scene.

One of the most common temporal accumulation techniques is temporal anti-aliasing (TAA). One technique that was developed to improve TAA is using history clamping as a way of dealing with dynamic events. Conventional temporal accumulation approaches typically involve the use of two buffers. A first buffer is a history buffer that contains a significant number of frames, such as 30 for a given application but may range from about 10 to 100 frames or more for other applications. These frames can be accumulated over time with a use of exponential moving average. A second buffer is a current buffer that contains data for a current frame, such as a most recent frame received from a rendering engine. In a conventional approach, this history buffer (h) is to be re-projected to the camera position for the current frame (c), and composited with the data for the current frame using, for example, an exponential moving average blend weight (w). In at least one implementation, a pixel value (p) for an output frame can be given by:

$$p = w*c + (1-w)*h$$

To deal with temporal lag, the history value is typically clamped to a min/max window of a pixel neighborhood (e.g., a 3×3 pixel window) from the current frame before temporal anti-aliasing. Other metrics can be used instead of min/max, such as may involve calculating mean and variance of a neighborhood and clamping the history value to that distribution. Such an existing approach is often not adequate for very noisy signals or dynamic scenes.

Another prior approach to attempt to manage temporal lag is A-SVGF, a spatiotemporal variance-guided filtering technique. Such a process is effectively a filtering technique that can take as input a noisy frame and reconstruct that into a full image with reduced noise. A-SVGF can produce desired results in many instances, but the time needed to produce these results may be too long for a ray tracer operating in real time at modern frame rates, such as at least 60 frames per second (fps). A-SVGF uses temporal gradients to minimize the temporal lag while denoising path traced imagery; however, since it must be integrated deeply into the renderer, it adds rendering cost and complexity to the renderer. Some games utilize velocity of the occluder to guide temporal accumulation of shadows. While this is a relatively simple solution, it comes with limitations and corner cases that are hard to solve. For example, if both occluder and receiver move, guiding the temporal accumulation becomes complicated. Further, when denoising ray trace effects, the current frame signal is typically very noisy and is not suited for calculating neighborhood clamping window since that window ends up being noisy as well.

Approaches in accordance with various embodiments utilize a responsive or "fast" history buffer together with a conventional history buffer and current frame buffer. A fast history buffer can utilize a much higher blend weight than is used for a conventional or "full" history buffer, such as on the order of a magnitude higher, such that fewer historical frames contribute to the fast history. This fast history can be used to determine a clamping window for a current frame in order to clamp the normal history value before, or after, re-projection. In at least one embodiment, a fast history clamping blend weight can be used as an intuitive knob to determine an appropriate balance between an amount of noise versus an amount of temporal lag in a scene. In at least one embodiment, a full history is maintained to provide for more accurate temporal smoothing in the absence of conditions causing clamping to be applied.

Figure 2:
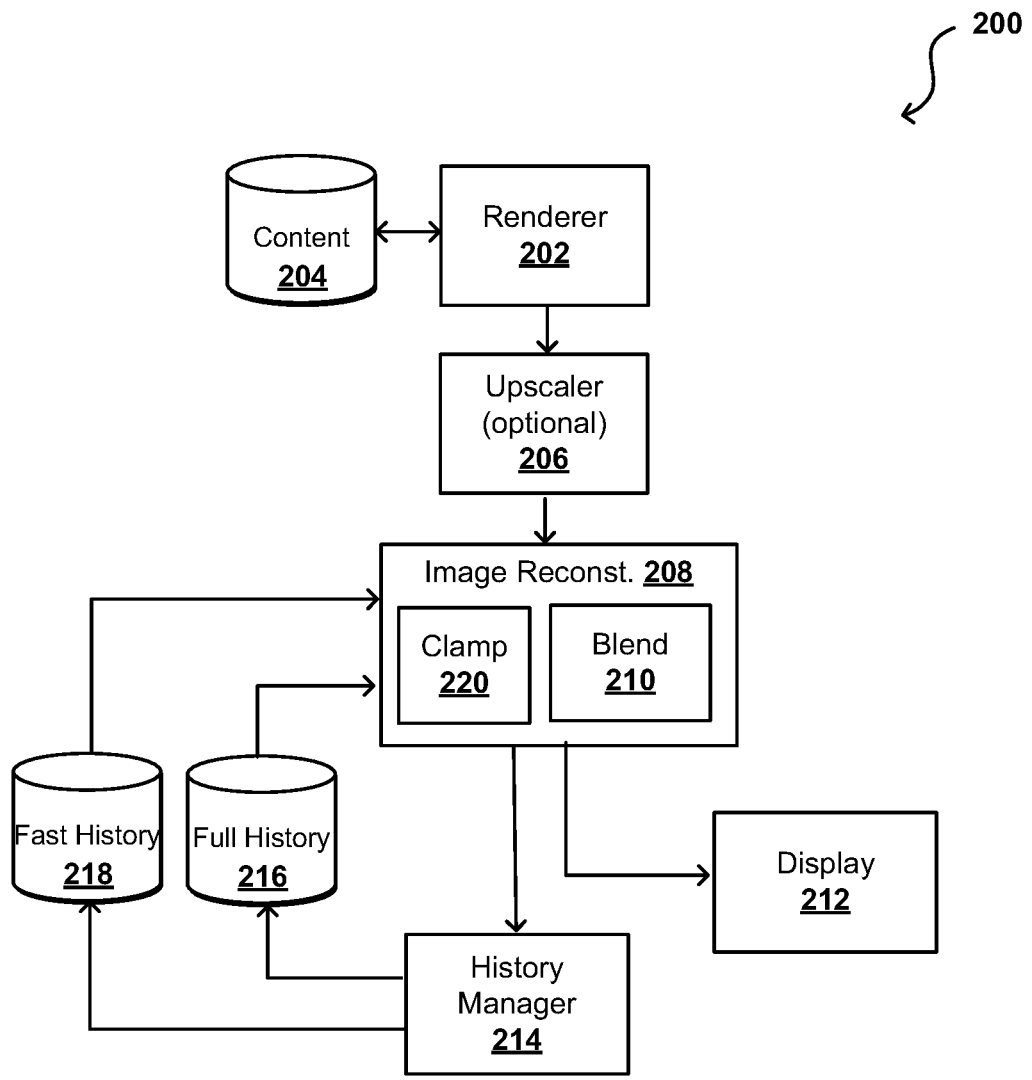
FIG. 2 illustrates an example image generation system, according to at least one embodiment.

FIG. 2 illustrates components of an example image generation system 200 that can be utilized in accordance with various embodiments. In at least one embodiment, content such as video game content or animation can be generated using a renderer 202, rendering engine, or other such content generation system or component. This renderer 202 can receive input for one or more frames of a sequence, and can generate images or frames of video using stored content 204 modified based at least in part upon that input. In at least one embodiment, this renderer 202 may be part of a rendering pipeline that can provide functionality such as deferred shading, global illumination, lit translucency, post-processing, and graphics processing unit (GPU) particle simulation using vector fields.

In some embodiments an amount of processing necessary for generating such complex, high-resolution images can make it difficult to render these video frames to meet current frame rates, such as at least sixty frames per second (fps). In at least one embodiment, a renderer 202 may be used to generate a rendered image at a resolution lower than one or more final output resolutions in order to meet timing requirements and reduce processing resource requirements. A renderer may instead render a current image (or a current image may otherwise be obtained) that is at a same resolution as a target output image, such that no upscaling or super-resolution procedure is required or utilized. In at least one embodiment, if a current rendered image is of a lower resolution, then this low-resolution rendered image can be processed using an (optional) upscaler 206 to generate an upscaled image that represents content of the low resolution rendered image at a resolution that equals (or is at least more closely approximates) a target output resolution.

This current rendered image, whether upscaled or not, can be provided as input to an image reconstruction module 208 that can generate a high resolution, anti-aliased output image using the current image and data for one or more previously-generated images, as may be at least temporarily stored in a full history buffer 216 or other such location. The previously-generated image can be a single historical image in some embodiments, where pixel (e.g., color) values are accumulated over a number of prior frames using, for example, an exponential moving average. In at least one embodiment, this image reconstruction module 208 can include a blending component 210, as may comprise one or more neural networks. In at least one embodiment, this may include at least a first optical flow network (OFN) for generating motion vectors or other information indicative or movement between adjacent frames in a sequence. In at least one embodiment, this can include an externally recurrent, pre-image reconstruction, unsupervised optical flow network. In at least one embodiment, this may also include at least a first image reconstruction network (RN) to utilize these motion vectors in order to correlate positions in a current image and a previous (historical) image and infer an output image from a blending of those images. In at least one embodiment, this blending of a current image with a historical image frame can help with temporal convergence to a nice, sharp, high-resolution output image, which can then be provided for presentation via a display 212 or other such presentation mechanism. In at least one embodiment, a copy of this output image can also be provided to a history manager 214, which can cause pixel values to be accumulated with values from prior historical frames using an accumulation factor, in order to enable this accumulated historical data to be represented by a single frame to conserve memory and reduce processing requirements. In at least one embodiment, a weighting factor can cause pixel values from older frames to contribute less to an accumulated pixel value. This historical image frame can then be stored to a full history buffer 216, or another such storage location, for blending with a subsequently-generated image in this sequence.

As mentioned, real-time temporal reconstruction of an image utilizes information from one or more prior frames after some warping to align to an image being generated for a current frame. In at least one embodiment, such warping is utilized at least in part because image reconstruction is simplified when pixel information in these images is aligned. In at least one embodiment, however, proper image warping utilizes not only information from a prior frame, but also additional information about how objects move between these frames. In at least one embodiment, this can include computer vision or optical flow data, which may be represented by a set of motion vectors. In at least one embodiment, this may include motion vectors for each pixel location, or at least pixel locations for which there is movement. This motion information can help to better warp image information and align corresponding pixels or objects. Motion vector information may be provided by a rendering engine for a game or application, but as mentioned this may not account for corresponding changes for aspects such as reflections or lighting that may result from a ray-tracing process. This blending may then result in temporal lag as discussed previously. Various prior approaches can apply clamping to attempt to reduce temporal lag, but come with various deficiencies presented previously.

Accordingly, in at least one embodiment history manager 214 can also generate a responsive or "fast" historical frame that can be stored to a fast history buffer 218. This fast frame can be generated using a different accumulation weight, which in some instances may be around an order of magnitude larger than an accumulation weight used to generate a full historical image. In one example, an accumulation weight for a fast historical frame is about 0.5, while an accumulation weight for a full historical frame is about 0.05. In at least one embodiment, this can result in a fast historical frame including data accumulated over a most recent two to four frames, while a full historical frame may include data accumulated over a most recent twenty to one hundred frames. These weights may be learned over time or set by a user, and may be configurable through one or more interfaces, among other such options.

In at least one embodiment, this fast history frame can be pulled from the fast history buffer 218 when the image reconstruction module 208 is to generate a next output frame in the sequence. As mentioned, it can be desirable to blend a newly rendered current frame with a full historical frame to provide for at least some temporal smoothing of the image to reduce a presence of artifacts when displayed. Instead of clamping based on the full historical frame, however, the clamping determination can be made using the fast historical frame, which will include historical data accumulated over only a small number of previous frames, such as the prior two to four frames in a sequence. A clamping module 220 can analyze a number of pixels in a region around a pixel location to be analyzed, such as pixels in a 3×3 pixel neighborhood of the fast historical image. Neighborhoods larger than 3×3 can be used, but may introduce additional spatial bias for at least some dynamic scenes. The blending module can then determine a distribution of expected pixel (e.g., color) values for that pixel. This expected distribution can then be compared against a value for a corresponding pixel in the full historical image. If the full historical pixel value is outside the distribution of expected values, then the pixel value can be "clamped" to, for example, the closest value to the historical pixel value that is within the distribution of expected values. Instead of clamping to the current value, which may lead to ghosting, noise, or other artifacts, this approach can clamp to an intermediate value that is determined using the fast historical frame. The blending module can then take the values, clamped or otherwise, from the full historical frame and blend accordingly with pixels of the current frame as discussed herein. This new image can then be processed by the history manager 214 to generate updated historical images to be stored in the historical buffers 216, 218 for reconstructing a subsequent image.

Such a clamping process may be better understood with respect to FIGS. 3A through 3E. As discussed, clamping analysis can be performed using a fast historical frame. This historical frame is generated by accumulating historical information for the individual pixels using an identified accumulation factor or blend weight. As mentioned, while an accumulation factor for a full historical frame may be on the order of around 0.05, an accumulation factor for a fast frame may be much larger, such as on the order of 0.5, such that contributions from older frames are minimized much more quickly. Minimal additional effort is needed to accumulate and re-project fast history in a system that is already accumulating full or "long" historical information. In this example, the blend weight is used with an exponential moving average of past frame data in order to avoid storing data for each of those past frames in memory. Data accumulated in history is multiplied by (1-weight) and then combined with the data in the current frame, which may be multiplied by the blending weight. In this way, a single historical frame can be stored in each buffer where contributions of older frames are lessened according to the recurrent accumulation approach. In at least one embodiment, this accumulation weight can be adjusted automatically based on any of a number of factors, such as a current frame rate to be provided, total variance, or amount of noise in produced frames.

Figure 3A:
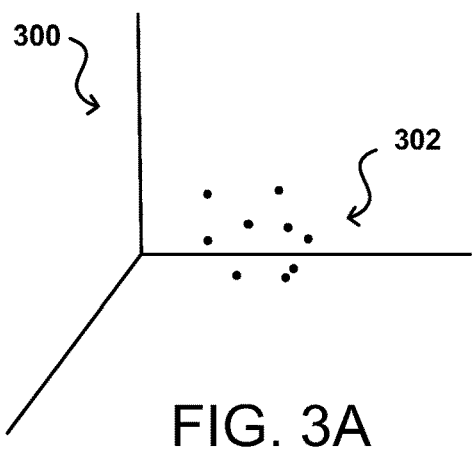
FIGS. 3A, 3B, 3C, 3D, and 3E illustrate stages in an example clamping process, according to at least one embodiment.
Figure 3B:
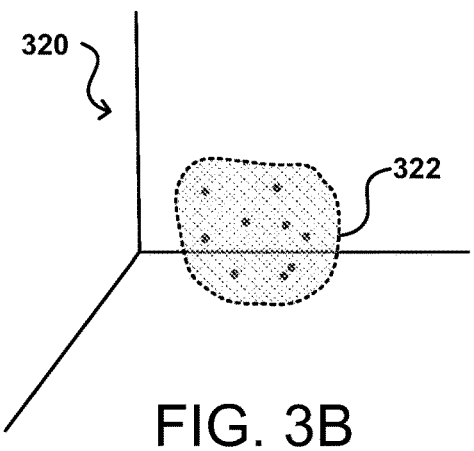
Figure 3C:
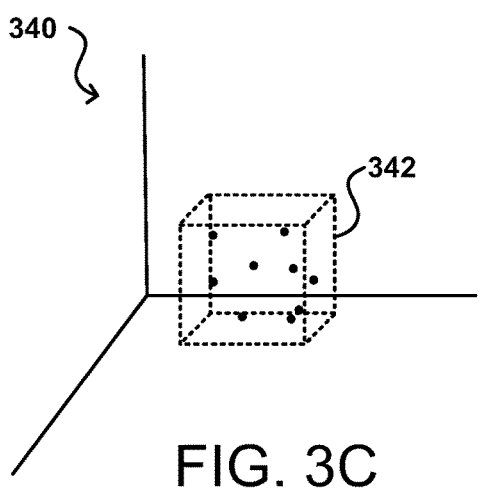

When a clamping analysis is to be performed, data for points in a surrounding neighborhood (e.g., a 3×3 neighborhood) for each pixel location in a fast historical frame can be determined. These pixel values can each be thought of as color points in a three-dimensional color space, as illustrated by points 302 in plot 300 of FIG. 3A. While red-green-blue (RGB) color space may be utilized in various embodiments, there may be other color spaces (e.g., YIQ, CMYK (cyan, magenta, yellow, and black), YCoCg, or HSL (hue, saturation, brightness value)) with other numbers of dimensions utilized in other embodiments. As illustrated in FIG. 3A, these points from the neighborhood are located in a region of color space. When determining pixel values for a historical frame that may be reasonably expected based on these points, various approaches can be utilized to determine these expected values. The expected value can be at, or within, a volume defined by these points, or a reasonable amount of distance outside this volume, as may be configurable and may depend at least in part upon the approach taken. In an example approach of FIG. 3B, the plot 320 shows an expectation region 322 surrounding these points. Any of a number of projection or expectation algorithms or networks can be utilized to determine or infer a size and shape of this expectation region. In one embodiment, a convex hull-based approach can be utilized. FIG. 3C illustrates another example approach, wherein a bounding box 342 can be determined for those points in color space as illustrated in the plot 340. The bounding box can be determined using a number of different bounding algorithms, which may include different amounts of buffering around these points in each direction. In at least one embodiment, this expectation region can be determined using a mean and variance distribution. Various other regions, boxes, ranges, or determinations can be used as well within the scope of the various embodiments.

Figure 3D:
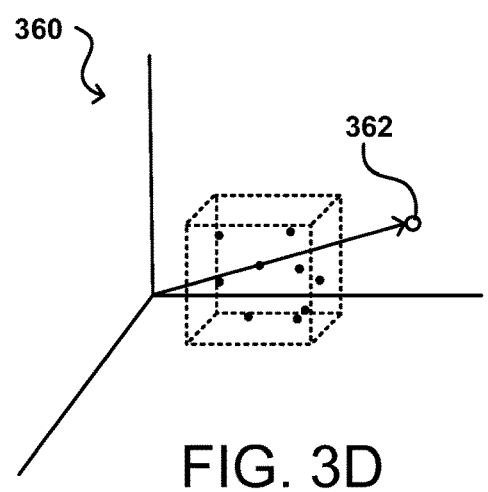
Figure 3E:
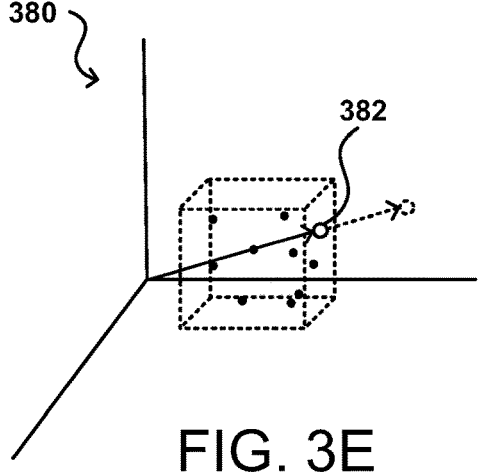

Once this expectation range or region is determined from the fast historical frame, the corresponding pixel from the full historical frame can be identified. The plot 360 of FIG. 3D illustrates a historical pixel value 362 in color space relative to the expectation region. The historical pixel can be compared against this expectation region to determine whether the pixel falls inside, or outside, the expectation region. If the pixel value is within the expected region then the corresponding full historical pixel value can be utilized and no clamping applied. It may be the case, however, that the historical point 362 may be outside the region, as illustrated in FIG. 3D. In this case, clamping can be applied to the historical value. Plot 380 of FIG. 3E illustrates that the pixel value can be "clamped," or adjusted so that it falls within the expected range. In this example, the clamped value 382 to be used for the full historical frame is the "clamped" value within the expectation range that is closest in color space to the fast historical pixel value. In one embodiment, this can involve clamping by applying a min/max analysis along each dimension of color space to determine the new clamped value.

Figure 4:
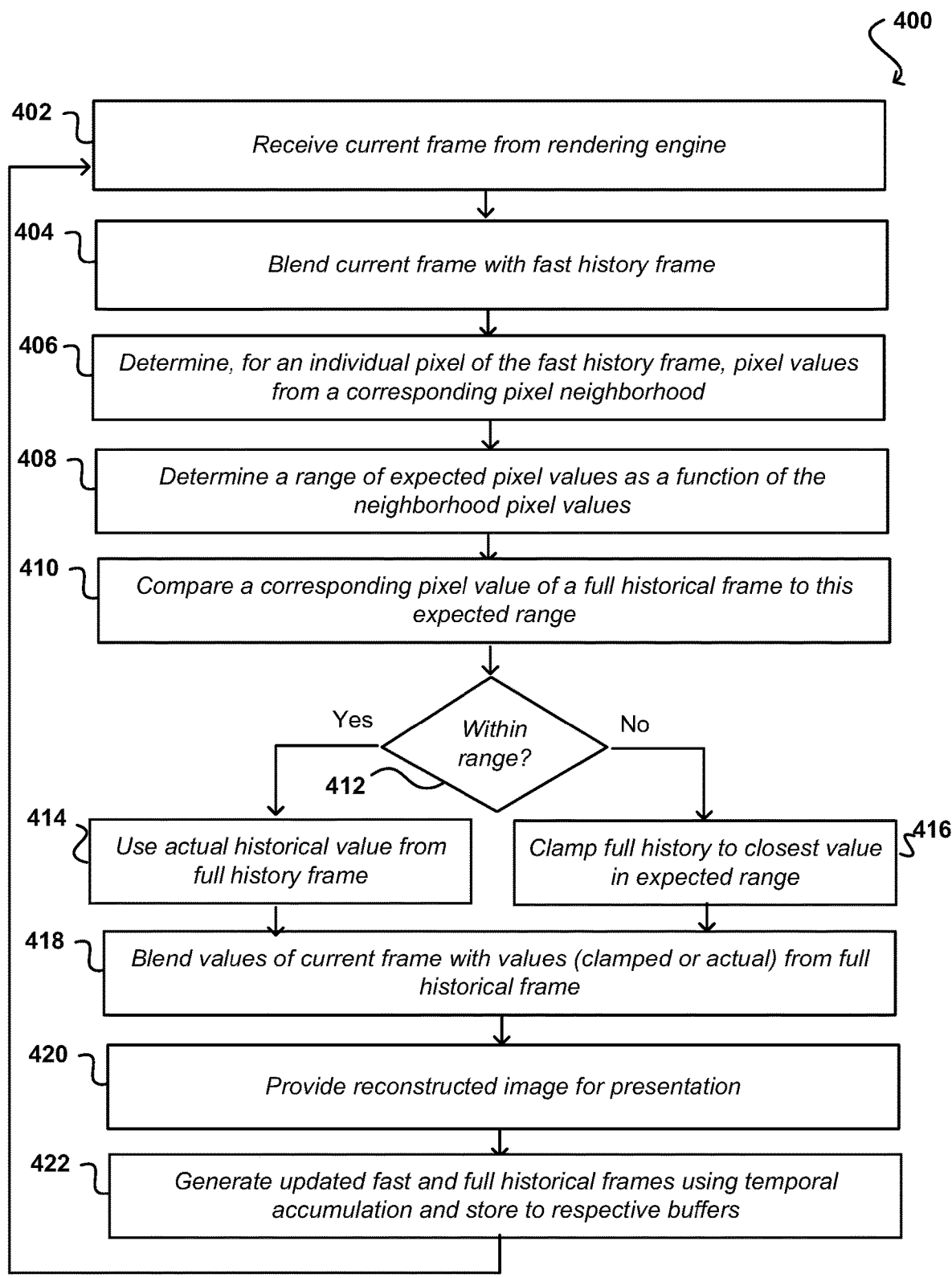
FIG. 4 illustrates an example history clamping process, according to at least one embodiment.

FIG. 4 illustrates an example process 400 for performing clamping of historical data that can be performed in accordance with various embodiments. It should be understood that for this and other processes presented herein there can be additional, fewer, or alternative steps performed in similar or alternative order, or at least partially in parallel, within scope of various embodiments unless otherwise specifically stated. In this example, a current frame is received 402 from a rendering engine, or otherwise obtained. This can be a current frame or image in a series of frames or images, such as may be generated for animation, gaming, virtual reality (VR), augmented reality (AR), video, or other such content. The current frame can be blended 404 with a corresponding fast history frame, using appropriate blend factors. Pixel values from corresponding pixel neighborhoods can be determined 406 for individual pixels of this fast history frame. A range of expected pixel values can then be determined 408 as a function of those neighborhood values. A corresponding pixel value from a full historical frame can be determined and compared 410 against this expected range. If it is determined 412 that the fast historical value is within the expected range, then the actual historical value from the full history frame can be used for this pixel location. If the fast historical value is outside this range, then a determination can be made to clamp 416 the full history value to the closest value within this expected range, such as by using a min/max or projection-based approach as discussed herein. Once such a determination is made for all relevant pixels, the values of the current frame can be blended 418 with the clamped or actual values of the corresponding pixels of the historical frame. Once completed, this reconstructed image can be provided 420 for presentation, such as through a display as part of a gaming experience. Further, updated fast and full historical frames can be generated 422 using temporal accumulation with this newly reconstructed image, and these historical frames can be stored using respective buffers for use in reconstructing a next image or frame in this sequence.

In at least one embodiment, an alternative process can be performed wherein blending can occur earlier in the process, such as at step 404 instead of step 418. In such an embodiment, the value can be clamped for a full historical frame that already contains the current frame value. While both approaches can produce acceptable results, one approach may be easier to implement in certain situations.

In order to further improve the appearance of generated images, some amount of blur (e.g., Gaussian blur) or other spatial filtering can be applied to dynamic scenes. This blur can help to smooth images in a sequence to provide for more natural motion, and can also help to reduce the presence of spatial sampling bias and artifacts such as noise or flickering. It can be difficult to determine the appropriate amount of blur to be applied to an image, as too much blur will reduce sharpness of the image, while too little blur may not sufficiently remove these and other such artifacts. Further, there may be portions of a scene with significant motion while other portions of that image are dynamic, such that it may be desirable to apply blur to portions with motion and not apply blur to portions that are static. As discussed herein, however, it can be difficult to identify motion related to shadows, reflections, and other aspects that may relate from a process such as ray tracing, such that it can be difficult in existing approaches to determine how much blur to apply to regions of an image associated with such aspect.

Accordingly, approaches in accordance with various embodiments can utilize information such as clamping determinations presented herein to determine application of blurring, spatial filtering, or other such image processing. In a clamping process presented with respect to at least one embodiment, clamping is applied when an amount of motion or change in an image causes a historical pixel value from a fast image frame to fall outside an expected range or region. Using such a process, a determination can be made for each pixel whether the pixel corresponds to a static portion of the image, a portion with an amount of motion or change that is within an expected range, or an amount of motion or change that is outside an expected range. In some embodiments, an amount of blur may be applied based on the pixel difference, regardless of whether that distance would result in clamping. An amount of blur or spatial filtering can be applied that may be different for any or all of these situations. In another example approach, a determination can be made for each pixel as to a difference between a pixel value for a fast historical frame and a full historical frame. This difference in pixel value, or distance in color space, can be used to determine an amount of blur to be applied or a weighting for a spatial filter. This difference can be determined before or after temporal accumulation clamping, and thus can be based on the raw or clamped values. For large differences, or pixels where clamping was applied, a larger spatial filter can be applied for those pixels. For smaller differences, a smaller spatial filter can be applied. If the fast and full historical pixel values are the same, within an allowable deviation, then no (or minimal) spatial filtering may be applied in certain embodiments. In some embodiments a minimal amount of spatial filtering may be applied to an entire image, with this history-based spatial filtering acting as an additional filter for pixels with greater degrees of motion or change.

In at least one embodiment, a difference can be calculated between the color of the full history and the color of the fast history, or between the color of the full history and the clamped full history. It should be understood that "full" history in this case refers to a number of history buffers accumulated in this image generation process at any given time, and does not require data from all previously generated images or frames in a sequence. This difference can be multiplied by a constant or scalar to determine a weight for the spatial filter to be applied. In at least one embodiment, this weighting can be used to determine a radius of blur to be applied, such as may be a radius of 0, 1, 2, or 3 pixels in any or all directions. Such an approach can be used to apply only the amount of blur needed for specific regions of an image, which can minimize an overall amount of blur applied to an image and thus result in a crisper image.

In at least one embodiment, temporal accumulation can be performed to generate a fast historical frame and a full historical frame using respective blending weights. History clamping can then be performed for individual pixel locations using determined neighborhoods of the fast history frame. In this example, a history confidence [0.0, 1.0] can be calculated, which is a function of the difference between the full history value and the clamped full history value at a given pixel location. This confidence value can be used as an indication of which pixels were affected by history clamping, as well as an extent to which these pixels were affected in at least one embodiment. In this example, a default amount of spatial filtering (e.g., cross-bilateral spatial filtering) can be applied to pixel locations in an image. The depth/normal bilateral weights can be set to a minimum, with an effective radius being calculated (within a pre-defined maximum radius) based at least in part upon some form of noise estimate, as may relate to temporal variance, spatial variance, or total variation, among other such options. In at least one embodiment, an additional spatial filter can be added that is a function of the history confidence calculated based on history clamping. In at least one embodiment, this can be a linear interpolation ("lerp") given by lerp(MaxRadius, EffectiveRadius, HistoryConfidence). In at least one embodiment, HistoryConfidence can be given by HistoryConfidence=saturate(abs(FullAccumulatedHistory−ClampedFullAccumulatedHistory)*ScalingFactor, where ScalingFactor can be any arbitrary scaling factor that has been determined to provide acceptable results for a given signal or implementation. In this example, abs( ) is absolute value function and saturate( ) clamps this value to a [0.0, 1.0] range. If there was no clamping for a pixel location, then no additional spatial filtering may be applied. In at least some embodiments, an amount of additional spatial filtering applied can be a factor of the difference between the pixel values for a given pixel in the fast historical frame versus the full historical frame.

Figure 5:
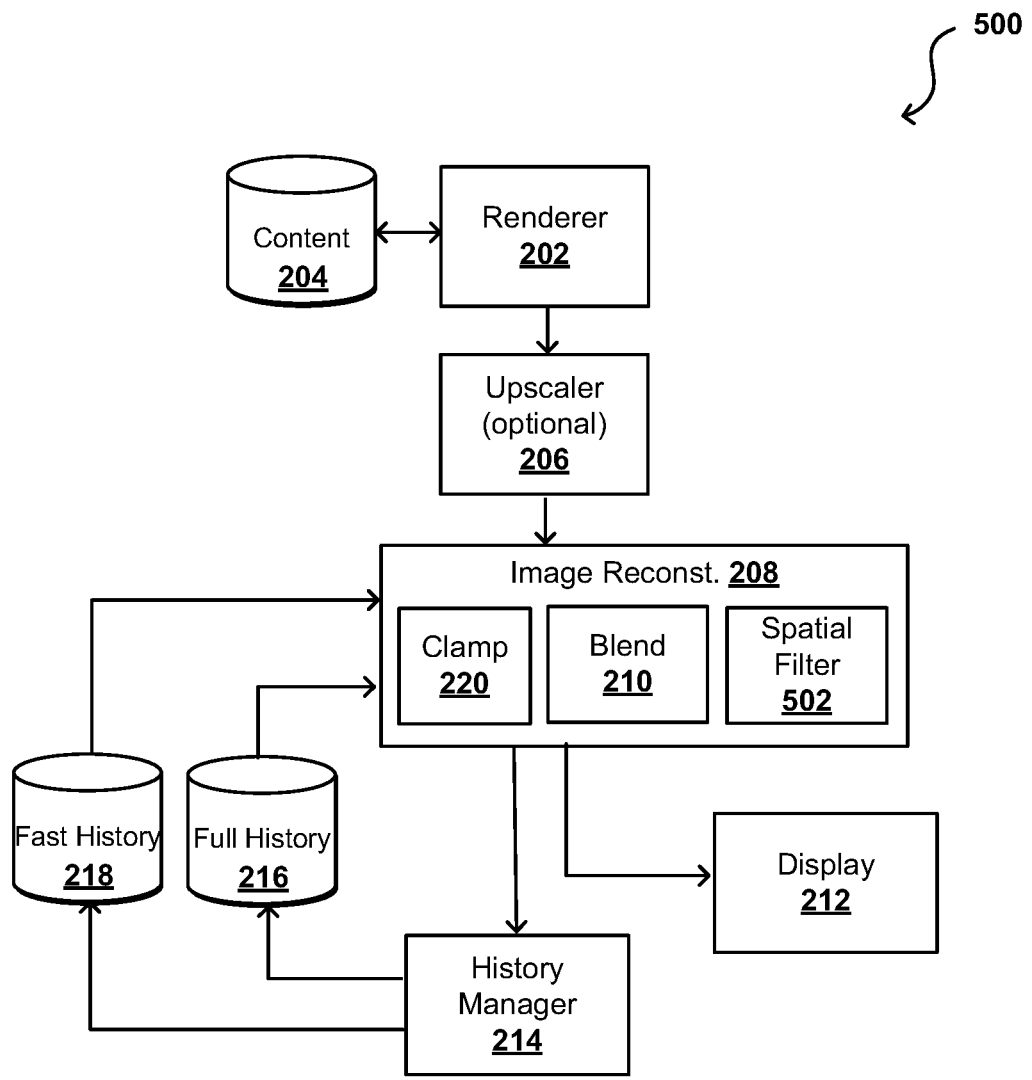
FIG. 5 illustrates an example image generation system including clamping-aware blur capability, according to at least one embodiment.

FIG. 5 illustrates an example system 500 that can be utilized in accordance with various embodiments. This system carries over reference numbers for similar components from FIG. 2, but it should be understood that this is for simplicity of explanation and should not be read as a limitation on the scope or variability of the various embodiments. In such a system, fast history and full history frames can be generated by a history manager component 214 as discussed previously. The fast history frame can be compared against a current frame to determine whether to apply clamping for specific pixel locations or regions of the full history frame. As mentioned, information from this clamping determination process can be used to determine an amount of spatial filtering to be applied during image reconstruction. In this example, clamping information can be passed from a clamping module 220 to a spatial filter module 502. In other embodiments, the spatial filter module 502 may act directly on the fast history and full history frames. The spatial filter module 502 can determine information such as whether clamping was applied and a difference between pixel values for corresponding pixel locations in the fast historical image and the full historical image. The spatial filter module 502 can then determine a size of a spatial filter or an amount of blur to be applied to each pixel of an image generated by the reconstruction module 208, which may include a single per-pixel determination, or may include a default filter amount plus any additional filtering determined from the clamping or historical confidence data. The reconstructed image with this additional filtering applied can then be provided for display, as well as provided to the history manager 214 for accumulation into updated full and fast historical frames for reconstruction of a next image or frame in this sequence.

Figure 6:
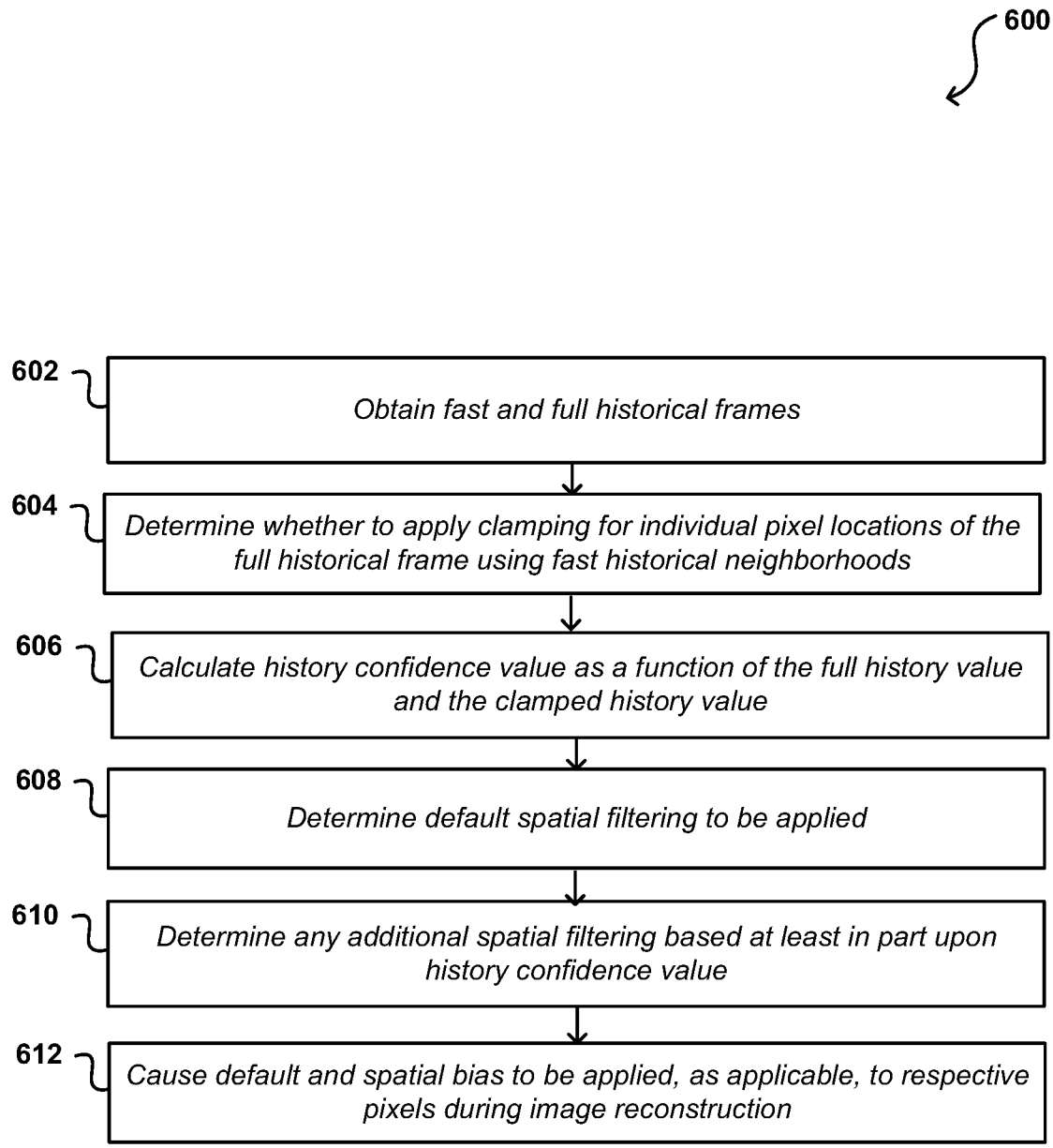
FIG. 6 illustrates a process for applying clamping-aware blur to an image, according to at least one embodiment.

FIG. 6 illustrates an example process 600 for determining spatial filtering to apply to an image during reconstruction that can be utilized in accordance with various embodiments. In this example, a clamping-based approach will be described, but as discussed herein history confidence values can be determined using other information as well. Fast and full historical frames are obtained 602 from a temporal accumulation process. It can be determined 604 whether to apply clamping to individual pixels of the full historical frame based at least in part upon values from pixels of corresponding pixel neighborhoods of the fast historical frame, such as whether the pixel value of a current frame falls within an expected range based on a given pixel neighborhood. A history confidence value can then be calculated 606 for individual pixel locations that may be a function of the full history value and the clamped history value. If a clamped value is not used, there can be high confidence in the full historical pixel value. For the pixels of the image, a default spatial filtering can be determined 608 to be applied during reconstruction. Further, any additional spatial filtering to be applied can be determined 610 based at least in part upon the history confidence value, where lower confidence corresponding to larger differences in pixel values may result in greater amounts of spatial filtering, such as use of a larger bias radius. The default and additional spatial bias can then be caused 612 to be applied to the respective pixels during image reconstruction. In this way, spatial filtering can be minimized for more static portions of an image.

As mentioned, such an approach can be advantageous when dealing with denoising of dynamic scenes. History clamping as discussed herein can help to detect stale history, and in instances where the stale history is detected it can be determined to temporarily bump a blending factor during temporal accumulation so that a heavier weight is assigned to the most recent data. While this may adequately address temporal lag, limiting a number of frames in temporal accumulation may introduce an unacceptable amount of noise. Since the system cannot rely on temporal data to remove this noise, a spatial bias can be increased in locations where stale history was detected in order to provide for enhanced denoising.

Other approaches for determining and applying spatial bias can be used as well in other embodiments, such as for determining temporal or spatial gradients, which may be independent of history clamping. Such gradients may be determined for an A-SGVF process, discussed previously. In another example, a velocity of occlusion can be used as a factor for determining whether to apply an additional, or increased, amount of spatial filtering during image reconstruction, as ambient occlusion can provide another confidence metric for anything that uses historical pixel data. Ambient occlusion is a feature of a process such as ray tracing, which may be used in a high definition render pipeline (HDRP). Ambient occlusion can be used to calculate an exposure of each point in a scene to ambient lighting. Other types of occlusion determinations can be used as well for other light sources, etc. A determined velocity of an occlusion, or occlude, can indicate whether, and how much, to trust historical pixel data. Rays from a given light source can be traced to determine whether the corresponding geometry is moving, changing, or static, as well as an amount of movement or change. In some cases, only a binary decision may be provided as to whether a pixel is static or dynamic based on occlusion velocity. In cases where velocity data is provided or determined, the blur radius or weight of the spatial filter can be increased with increases in velocity. Further, in some embodiments where HistoryConfidence may be somewhat temporally unstable, this value can be re-projected and slightly increased over a few frames in order to make a spatial filter bias temporally smoother. Such an approach can help with denoising an otherwise improving image quality in situations where stale history data is detected.

Data Center

Figure 7:
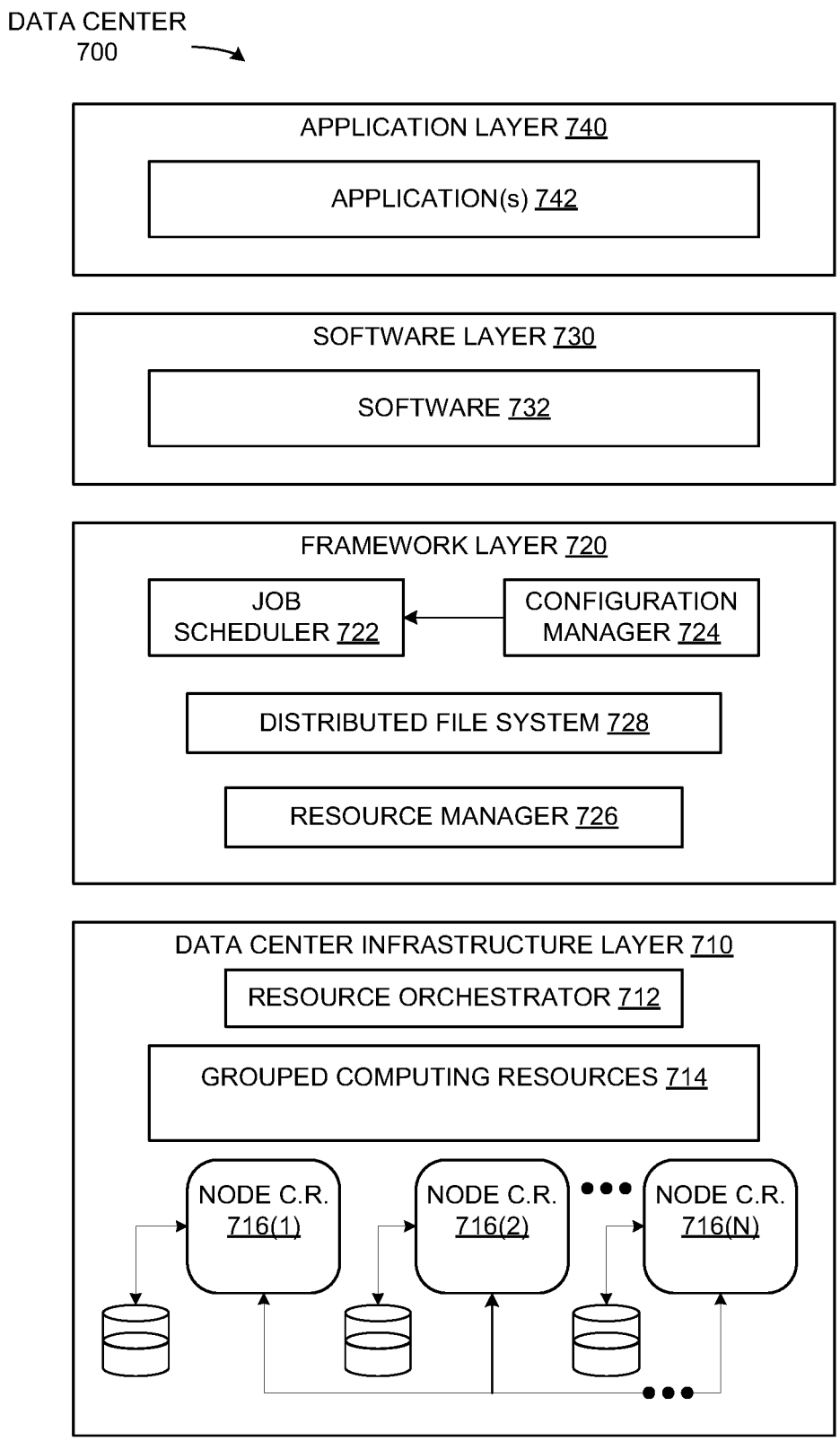
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to improve image quality during image reconstruction using fast history-based clamping and difference determinations.

Computer Systems

Figure 8:
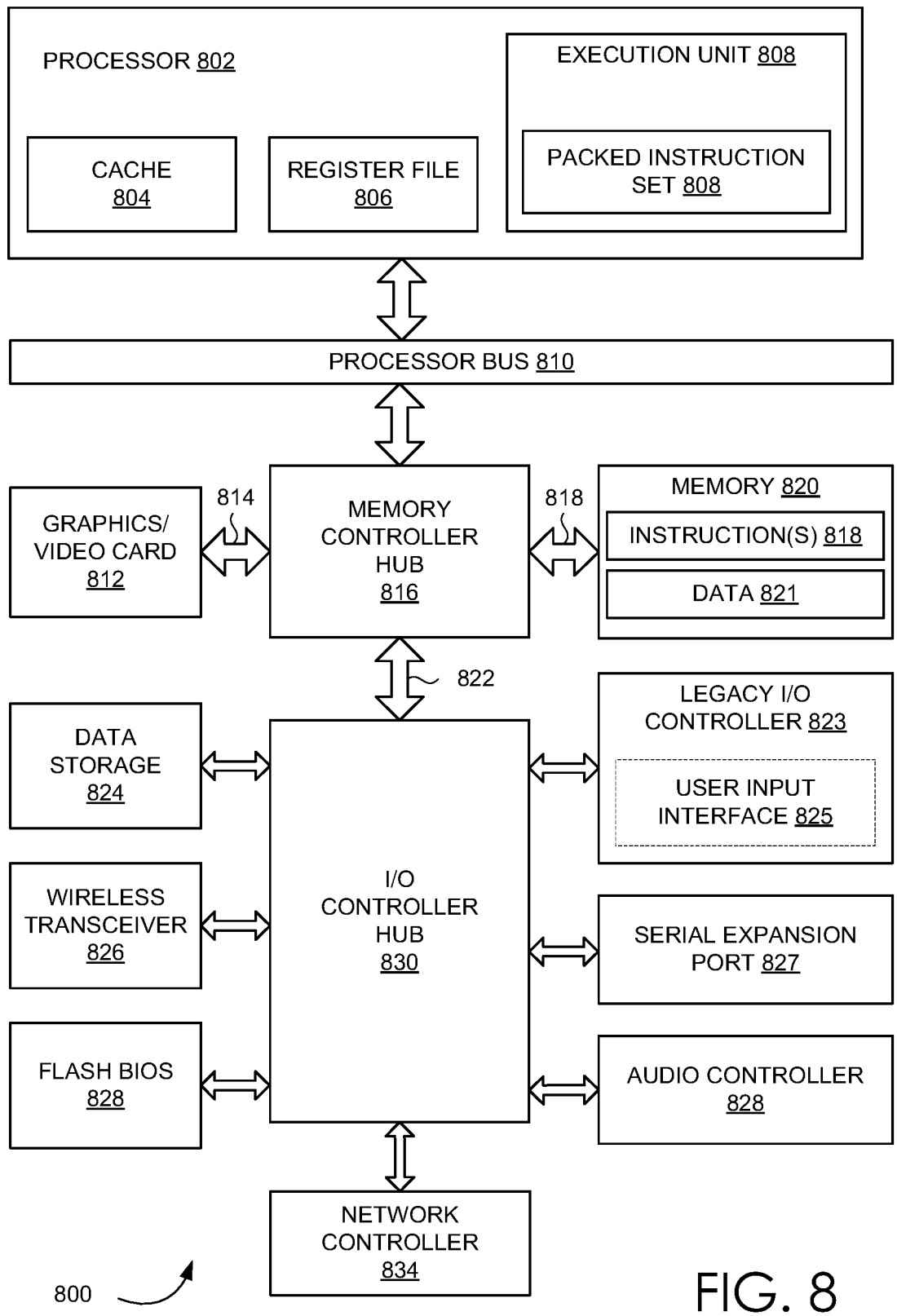
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used to improve image quality during image reconstruction using fast history-based clamping and difference determinations.

Figure 9:
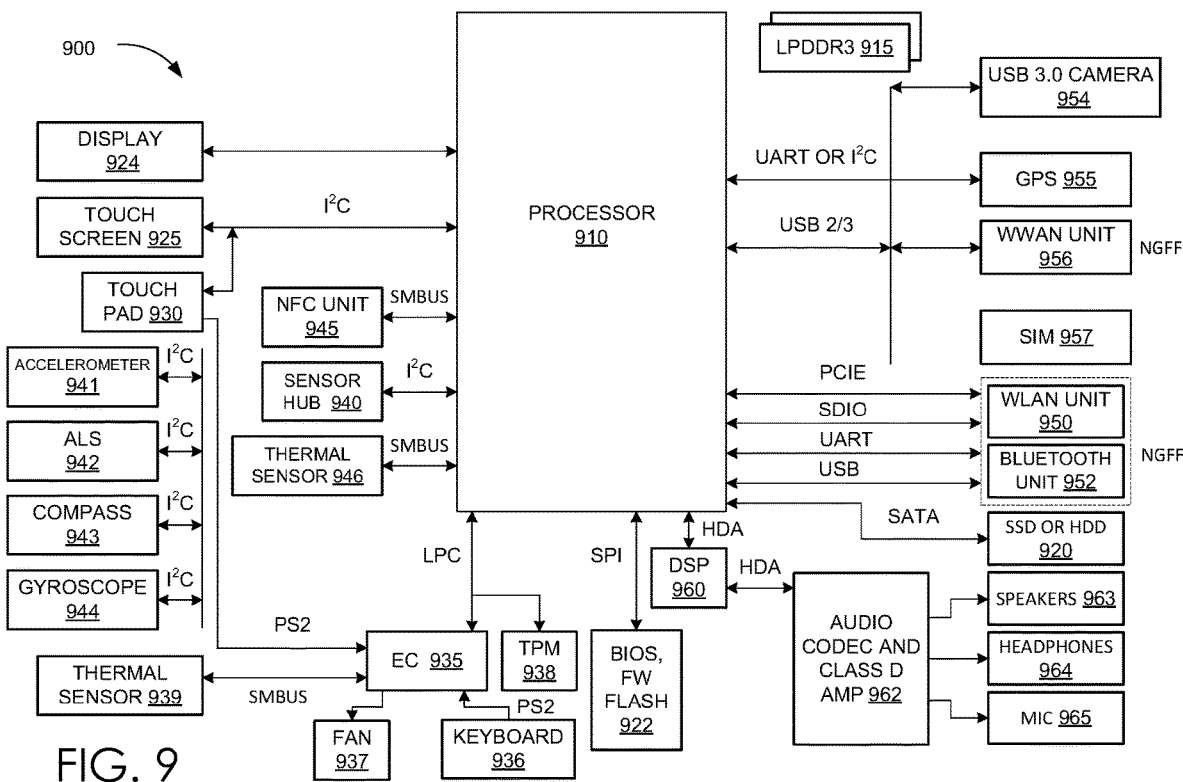
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used to improve image quality during image reconstruction using fast history-based clamping and difference determinations.

Figure 10:
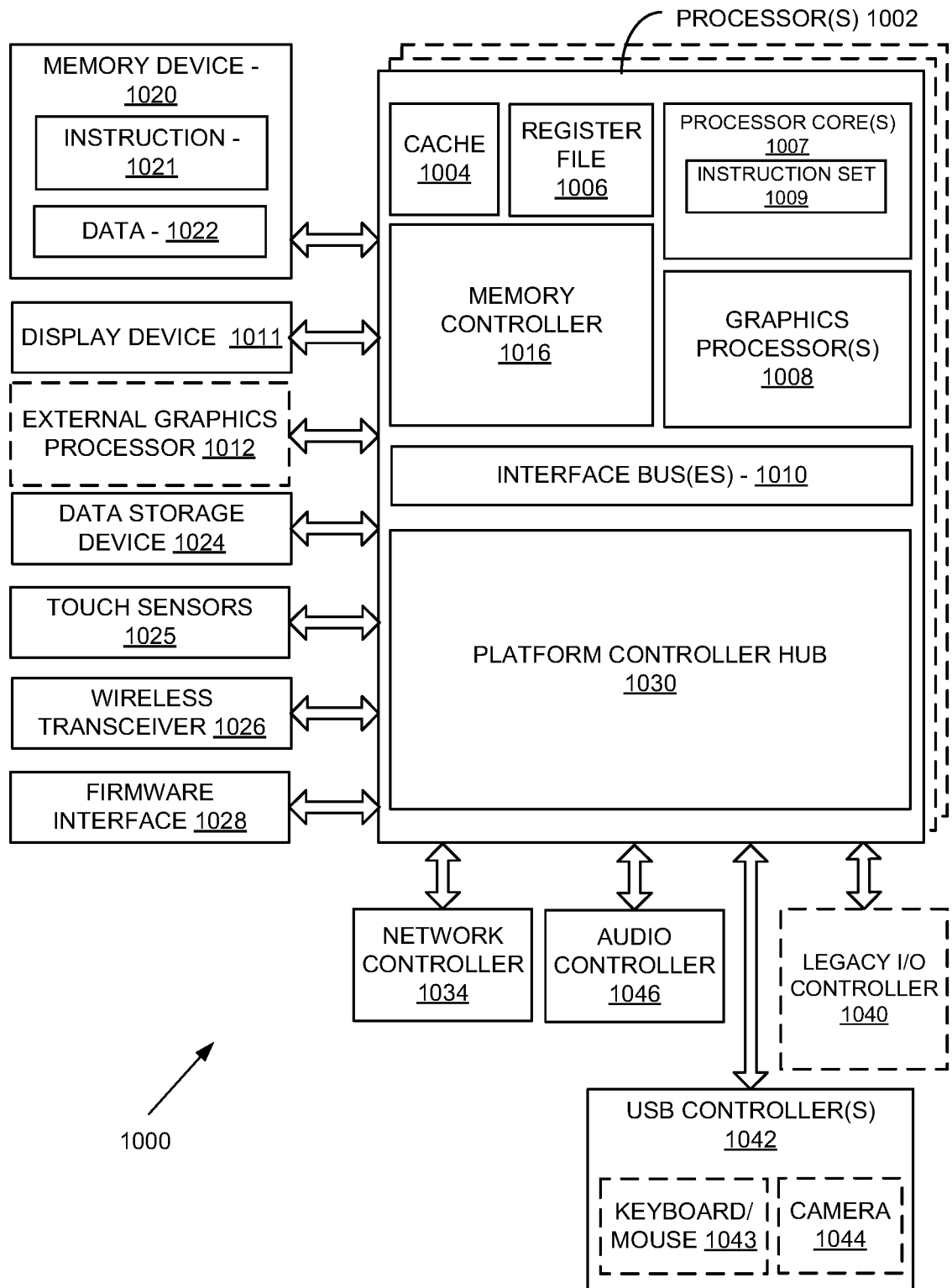
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used to improve image quality during image reconstruction using fast history-based clamping and difference determinations.

Figure 11:
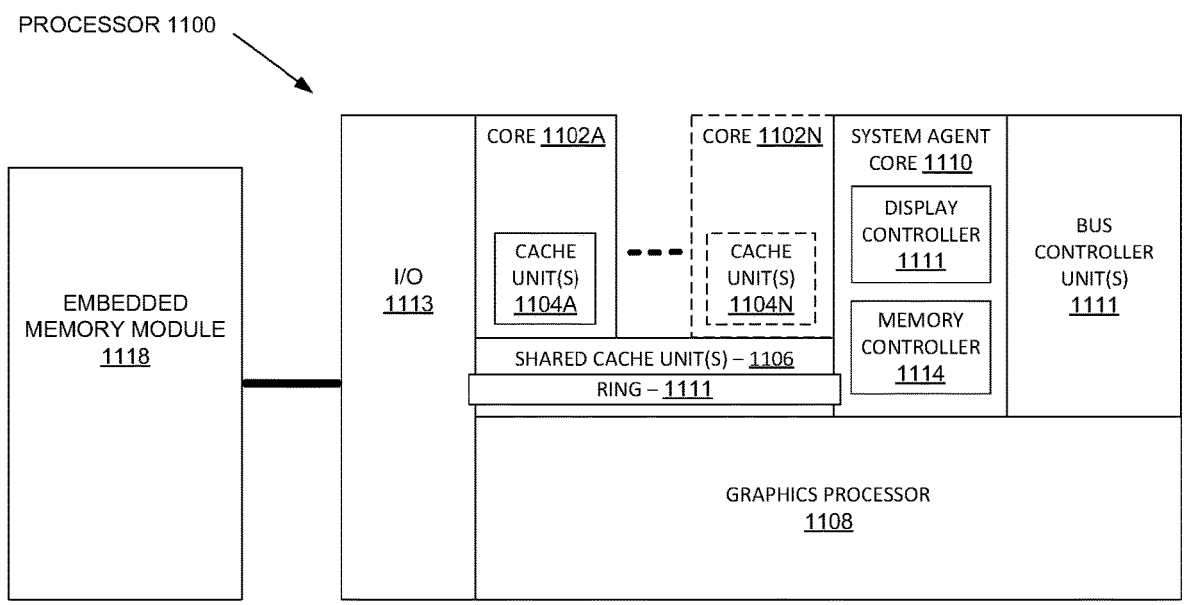
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used to improve image quality during image reconstruction using fast history-based clamping and difference determinations.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   generating a fast historical frame for a rendered frame;
   determining, from the fast historical frame, a set of fast pixel values corresponding to a pixel location of the rendered frame;
   determining a range of expected pixel values based at least in part upon the fast pixel values;
   determining that a historical pixel value from a full historical frame is outside the range of expected pixel values;
   clamping the historical pixel value, from the full historical frame, to a clamped pixel value within the range of expected pixel values; and
   blending a pixel value for the pixel location of the rendered frame with the clamped value as part of an image reconstruction process.

2. The method of claim 1, further comprising:
   providing an image resulting from the image reconstruction process to a temporal accumulation process for updating the fast historical frame and the full historical frame and storing to respective buffers for the image reconstruction process.

3. The method of claim 2, further comprising:
   determining a first temporal accumulation weight for generating the fast historical frame and a second temporal accumulation weight for generating the full historical frame, the first temporal accumulation weight being higher than the second temporal accumulation weight.

4. The method of claim 2, further comprising:
   performing an initial blending of the rendered frame with the fast historical frame.

5. The method of claim 2, further comprising:
providing the image, resulting from the image reconstruction process, for display as part of an image sequence.

6. The method of claim 1, wherein the set of fast pixel values is determined from a pixel neighborhood surrounding the pixel location in the fast historical image.

7. The method of claim 1, further comprising:
determining, from a second rendered frame, a second set of fast pixel values corresponding to a pixel location;
determining a second range of expected pixel values based at least in part upon the second set of fast pixel values;
determining that an updated historical pixel value from the fast historical frame is within the second range of expected pixel values; and
using the updated historical pixel value from the full historical frame when blending with a second current pixel value for the pixel location of the second rendered frame.

8. The method of claim 1, wherein the expected range corresponds to a region in color space, the region being one of a bounding shape, convex hull, or amorphous region surrounding locations of the current pixel values in the color space.

9. The method of claim 8, wherein clamping the historical pixel value includes at least one of applying a mix/max threshold for each color component, determining a closest value in the color space, or determining a point of intersection of a color vector with a boundary of the region in the color space.

10. A system, comprising:
a processor; and
memory including instructions that, when executed by the processor, cause the system to:
generate a fast historical frame for a rendered frame;
determine, from the fast historical frame, a set of fast pixel values corresponding to a pixel location;
determine a range of expected pixel values based at least in part upon the fast pixel values;
determine that a historical pixel value from a full historical frame is outside the range of expected pixel values;
clamp the historical pixel value, from the full historical frame, to a clamped pixel value within the range of expected pixel values; and
blend a current pixel value for the pixel location of the rendered frame with the clamped value as part of an image reconstruction process.

11. The system of claim 10, wherein the instructions when executed further cause the system to:
provide an image resulting from the image reconstruction process to a temporal accumulation process for updating the fast historical frame and the full historical frame and storing to respective buffers for the image reconstruction process.

12. The system of claim 11, wherein the instructions when executed further cause the system to:
determine a first temporal accumulation weight for generating the fast historical frame and a second temporal accumulation weight for generating the full historical frame, the first temporal accumulation weight being higher than the second temporal accumulation weight.

13. The system of claim 10, wherein the set of pixel values is determined from a pixel neighborhood surrounding the pixel location in the fast historical image.

14. The system of claim 10, wherein the instructions when executed further cause the system to:
determine, from a second rendered frame, a second set of fast pixel values corresponding to a pixel location;
determine a second range of expected pixel values based at least in part upon the second set of fast pixel values;
determine that an updated historical pixel value from the full historical frame is within the second range of expected pixel values; and
use the updated historical pixel value from the full historical frame when blending with a second current pixel value for the pixel location of the second rendered frame.

15. The system of claim 10, wherein the expected range corresponds to a region in color space, the region being one of a bounding shape, convex hull, or amorphous region surrounding locations of the current pixel values in the color space, and wherein clamping the second historical pixel value includes at least one of applying a mix/max threshold for each color component, determining a closest value in the color space, or determining a point of intersection of a color vector with a boundary of the region in the color space.

16. A non-transitory computer-readable storage medium including instructions that, if executed by a processor, cause the processor to:
generate a fast historical frame for a rendered frame;
determine, from the fast historical frame, a set of fast pixel values corresponding to a pixel location;
determine a range of expected pixel values based at least in part upon the fast pixel values;
determine that a historical pixel value from a full historical frame is outside the range of expected pixel values;
clamp the historical pixel value, from the full historical frame, to a clamped pixel value within the range of expected pixel values; and
blend a current pixel value for the pixel location of the rendered frame with the clamped value as part of an image reconstruction process.

17. The non-transitory computer-readable storage medium of claim 16, wherein the instructions when executed further cause the processor to:
provide an image resulting from the image reconstruction process to a temporal accumulation process for updating the fast historical frame and the full historical frame and storing to respective buffers for the image reconstruction process.

18. The non-transitory computer-readable storage medium of claim 17, wherein the instructions when executed further cause the processor to:
determine a first temporal accumulation weight for generating the fast historical frame and a second temporal accumulation weight for generating the full historical frame, the first temporal accumulation weight being higher than the second temporal accumulation weight.

19. The non-transitory computer-readable storage medium of claim 16, wherein the instructions when executed further cause the processor to:
determine, from a second rendered frame, a second set of fast pixel values corresponding to a pixel location;
determine a second range of expected pixel values based at least in part upon the second set of fast pixel values;
determine that an updated historical pixel value from the full historical frame is within the second range of expected pixel values; and
use the updated historical pixel value from the full historical frame when blending with a second current pixel value for the pixel location of the second rendered frame.

20. The non-transitory computer-readable storage medium of claim 16, wherein the expected range corresponds to a region in color space, the region being one of a bounding shape, convex hull, or amorphous region surrounding locations of the current color values in the color space, and wherein clamping the second historical pixel value includes at least one of applying a mix/max threshold for each color component, determining a closest value in the color space, or determining a point of intersection of a color vector with a boundary of the region in the color space.

* * * * *